(12) United States Patent
Bankoski et al.

(10) Patent No.: US 8,693,547 B2
(45) Date of Patent: Apr. 8, 2014

(54) APPARATUS AND METHOD FOR CODING USING MOTION VECTOR SEGMENTATION

(75) Inventors: James Bankoski, Wynantskill, NY (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 441 days.

(21) Appl. No.: 13/081,097

(22) Filed: Apr. 6, 2011

(65) Prior Publication Data

US 2012/0257676 A1    Oct. 11, 2012

(51) Int. Cl.
*H04N 7/12*    (2006.01)
*H04N 7/50*    (2006.01)

(52) U.S. Cl.
CPC .................................. *H04N 7/50* (2013.01)
USPC ................................................... 375/240.16

(58) Field of Classification Search
USPC ........................................................ 375/240
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,512,952 A | 4/1996 | Iwamura | |
| 5,731,840 A | 3/1998 | Kikuchi et al. | |
| 5,886,742 A | 3/1999 | Hibi et al. | |
| 5,991,428 A * | 11/1999 | Taniguchi | 382/107 |
| 5,991,447 A | 11/1999 | Eifrig et al. | |
| 6,005,980 A | 12/1999 | Eifrig et al. | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,711,211 B1 | 3/2004 | Lainema | |

(Continued)

FOREIGN PATENT DOCUMENTS

| | | |
|---|---|---|
| EP | 0634873 B1 | 9/1998 |
| WO | WO 02/093488 | 11/2002 |
| WO | WO 2005/094083 | 10/2005 |
| WO | WO 2010/149900 | 12/2010 |

OTHER PUBLICATIONS

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

(Continued)

*Primary Examiner* — Joseph Ustaris
*Assistant Examiner* — Talha Nawaz
(74) *Attorney, Agent, or Firm* — Young Basile Hanlon & MacFarlane P.C.

(57) ABSTRACT

Disclosed herein is a method for encoding a video signal having at least one frame with a plurality of blocks having pixels. The method includes determining motion vectors for a first block in the at least one frame and at least some of the blocks that are neighbors to the first block, identifying neighboring blocks having motion vectors that are similar to the motion vector of the first block, assigning the first block and the identified neighboring blocks to a segment using a processor, applying a segment parameter to at least one block in the segment and encoding the at least one block using the segment parameter.

18 Claims, 7 Drawing Sheets

(56) References Cited

U.S. PATENT DOCUMENTS

| | | | |
|---|---|---|---|
| 6,735,249 B1 | 5/2004 | Karczewicz et al. | |
| 8,503,528 B2* | 8/2013 | Grange et al. | 375/240.13 |
| 2002/0031272 A1 | 3/2002 | Bagni et al. | |
| 2002/0176502 A1* | 11/2002 | Rose et al. | 375/240.13 |
| 2006/0072664 A1* | 4/2006 | Kwon et al. | 375/240.16 |
| 2006/0093038 A1* | 5/2006 | Boyce | 375/240.16 |
| 2007/0274388 A1* | 11/2007 | Lee et al. | 375/240.13 |
| 2010/0074332 A1* | 3/2010 | Karczewicz et al. | 375/240.12 |
| 2012/0106646 A1* | 5/2012 | Cammas et al. | 375/240.16 |

OTHER PUBLICATIONS

Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.

International Search Report and Written Opinion for International Patent Application PCT/US2012/031441; dated Jun. 27, 2012.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Wright, R. Glenn, et al.; "Multimedia—Electronic Technical Manual for ATE", IEEE 1996, 3 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.: "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

* cited by examiner

| MV=NEW B0 | MV=B0 B1 | MV=B0 B2 | MV=B0 B3 |
|---|---|---|---|
| MV=B0 B4 | MV=NEW B5 | MV=B5 B6 | MV=B0 B7 |
| MV=B0 B8 | MV=B5 B9 | MV=B5 B10 | MV=B0 B11 |
| MV=NEW B12 | MV=NEW B13 | MV=NEW B14 | MV=B0 B15 |

| 1 B0 | 1 B1 | 1 B2 | 1 B3 |
|---|---|---|---|
| 1 B4 | 2 B5 | 2 B6 | 1 B7 |
| 1 B8 | 2 B9 | 2 B10 | 1 B11 |
| B12 | B13 | B14 | 1 B15 |

APPARATUS AND METHOD FOR CODING USING MOTION VECTOR SEGMENTATION

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use different techniques to achieve compression. For example, many of these schemes use prediction techniques that predict where information contained in a portion of a first frame or first region of a frame can be found in a second frame or second region of the frame. The difference between the prediction and the portion of data in the second frame or second frame region is calculated to form a residual. One type of prediction, known as intra prediction, can be based on previously coded image samples within the current frame. Another type of prediction known as inter prediction can be based on previously coded frames ("reference frames"). One inter prediction technique, for example, can utilize block-based motion estimation and compensation. Motion estimation can involve searching for a sample region in a reference frame that, for example, closely matches a current block in a current frame. The luma and chroma samples of the matching sample region are subtracted from the current block to produce a residual that is encoded. A motion vector is also encoded that describes the position of the matching sample region relative to the position of the current block.

SUMMARY

Embodiments of a method for encoding a video signal having at least one frame with a plurality of blocks having pixels are disclosed herein. In one embodiment, the method includes determining motion vectors for a first block in the at least one frame and at least some of the blocks that are neighbors to the first block, identifying neighboring blocks having motion vectors that are similar to the motion vector of the first block, assigning the first block and the identified neighboring blocks to a segment using a processor, applying a segment parameter to at least one block in the segment and encoding the at least one block using the segment parameter.

In another embodiment, the method includes determining motion vectors for a first block in the at least one frame and at least some of the blocks that are neighbors to the first block and identifying neighboring blocks having motion vectors that are similar to the motion vector of the first block. The method also includes assigning the first block and the identified neighboring blocks to a first segment using a processor and assigning at least some blocks in the at least one frame that have motion vectors that are dissimilar to the motion vector of the first block to a second segment. Further, the method includes applying a first segment parameter to at least one block in the first segment.

Embodiments of an apparatus of for encoding a video signal having at least one frame with a plurality of blocks having pixels are also disclosed herein. In one embodiment, the apparatus includes a memory and a processor configured to execute instructions stored in the memory to determine motion vectors for a first block in the at least one frame and at least some of the blocks that are neighbors to the first block and identify neighboring blocks having motion vectors that are similar to the motion vector of the first block. The processor is also configured to execute instructions stored in the memory to assign the first block and the identified neighboring blocks to a segment and apply a segment parameter to at least one block in the segment.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
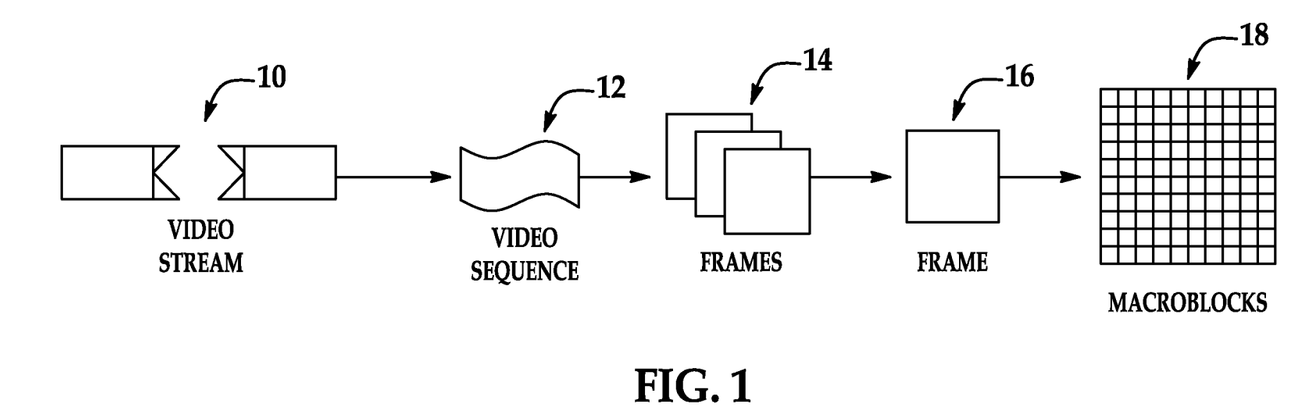
FIG. 1 is a diagram of a video bitstream.

FIG. 1 is a diagram of a video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can be further subdivided into a single frame 16. At the next level, frame 16 can be divided into a series of macroblocks 18, which contain data corresponding to, for example, a 16×16 block of displayed pixels. Each of macroblocks 18 can contain luminance and chrominance data for the corresponding pixels. Macroblocks 18 can also be of any other suitable size such as 16×8 pixel groups or 8×16 pixel groups.

Figure 2:
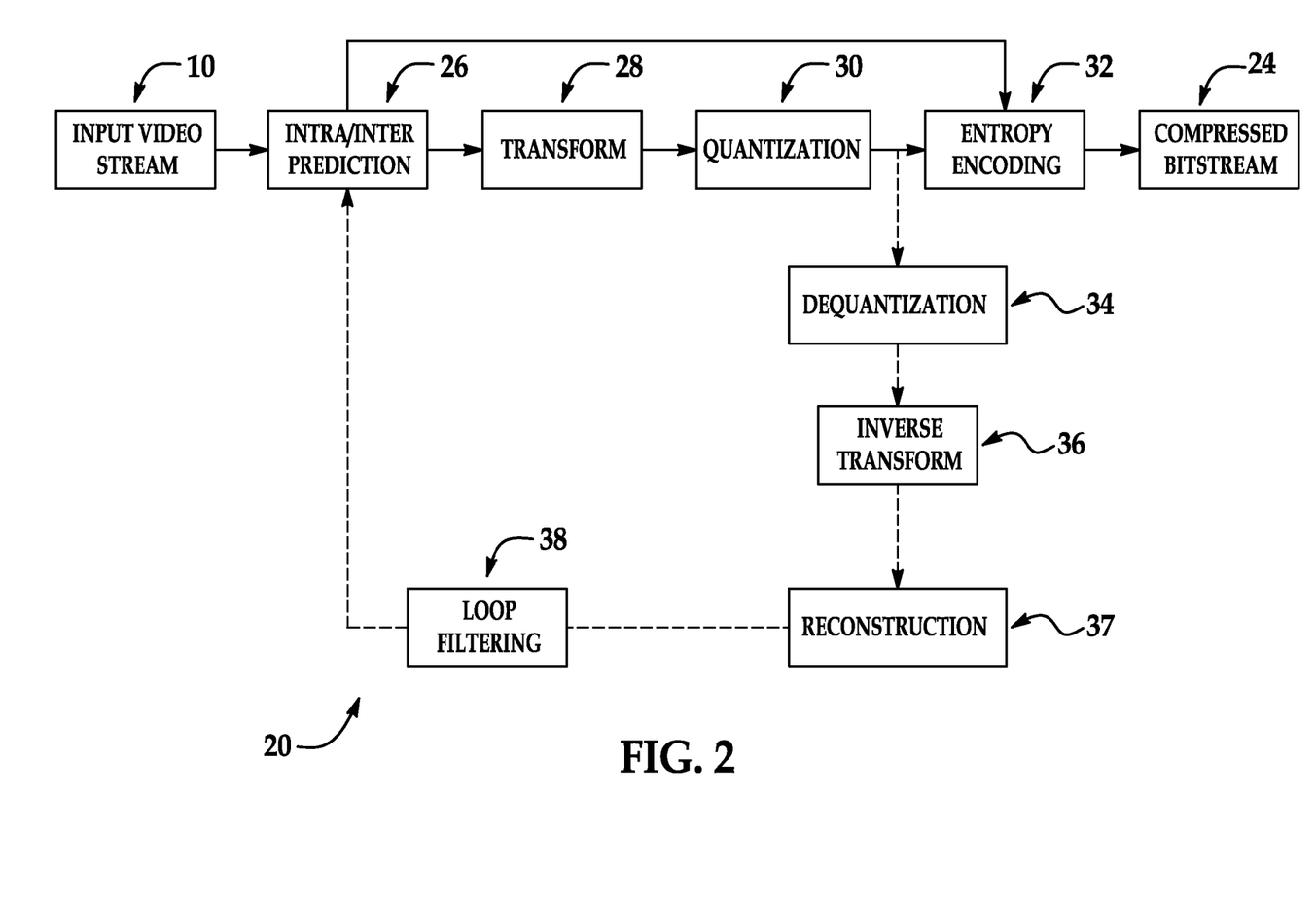
FIG. 2 is a block diagram of a video compression system in accordance with one embodiment.

FIG. 2 is a block diagram of a video compression system in accordance with one embodiment. An encoder 20 encodes an input video stream 10. Encoder 20 preferably has the following stages to perform the various functions in a forward path (shown by the solid connection lines) to produce an encoded or compressed bitstream 24: intra/inter prediction stage 26, transform stage 28, quantization stage 30 and entropy encoding stage 32. Encoder 20 also includes a reconstruction path (shown by the dotted connection lines) to reconstruct a frame for encoding of further macroblocks. Encoder 20 preferably has the following stages to perform the various functions in the reconstruction path: dequantization stage 34, inverse transform stage 36, reconstruction stage 37 and loop filtering stage 38.

When input video stream 10 is presented for encoding, each frame 16 within input video stream 10 is processed in units of macroblocks. At intra/inter prediction stage 26, each macroblock can be encoded using either intra prediction or inter prediction. In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients, and quantization stage 30 quantizes the transform coefficients to provide a set of quantized transform coefficients. The quantized transform coefficients are then entropy encoded by entropy encoding stage 32. The entropy-encoded coefficients, together with the information required to decode the macroblock, such as the type of prediction used, motion vectors and quantizer value, are then output to compressed bitstream 24.

The reconstruction path in FIG. 2 is present to ensure that both the encoder and the decoder use the same reference frames to decode the macroblocks. The reconstruction path performs functions that are similar to functions that take place during the decoding process that are discussed in more detail below, including dequantizing the transform coefficients at a dequantization stage 34 and inverse transforming the dequantized transform coefficients at an inverse transform stage 36 in order to produce a derivative residual macroblock (derivative residual). At reconstruction stage 37, the prediction macroblock that was predicted at prediction stage 26 can be added to the derivative residual to create a reconstructed macroblock. A loop filter 38 can then be applied to the reconstructed macroblock to reduce blocking distortion.

Other variations of encoder 20 can be used to encode compressed bitstream 24. For example, a non-transform based encoder can quantize the residual signal directly without transform stage 28. In another embodiment, an encoder may have quantization stage 30 and dequantization stage 34 combined into a single stage. The operation of encoding can be performed in many different ways and can produce a variety of encoded data formats. The above-described embodiments of encoding may illustrate some exemplary encoding techniques. However, in general, encoding is understood to mean any transformation of data from one form to another that may or may not include compression, reversibility, or loss of data.

The encoding process shown in FIG. 2 can include two or more iterations or "passes" of processing the video data. For example, a first pass can be carried out by encoder 20 using an encoding process that is less computationally intensive, and that gathers and stores information about input video stream 10 for use in a second pass. In the second pass, encoder 20 can use this information to optimize final encoding of input video stream 10. For example, encoder 20 can use this information to select parameters for encoding, key-frames and coding modes used to encode macroblocks 18, and to allocate the number of bits used to encode each frame. The output of the second pass can be final compressed bitstream 24.

The coding mode can be used to indicate which motion vector should be used for a block in the second pass. For example, the coding mode can indicate that a new motion vector should be calculated for the block. Alternatively, the coding mode can indicate that the motion vector belonging to a neighboring block should be used, or that no motion vector (i.e., a zero motion vector) should be used. Other suitable coding modes are also available. For example, other coding modes can indicate that the motion vector from the block above, the block below, or the block to the left or the right should be used as the motion vector for the current block.

Figure 3:
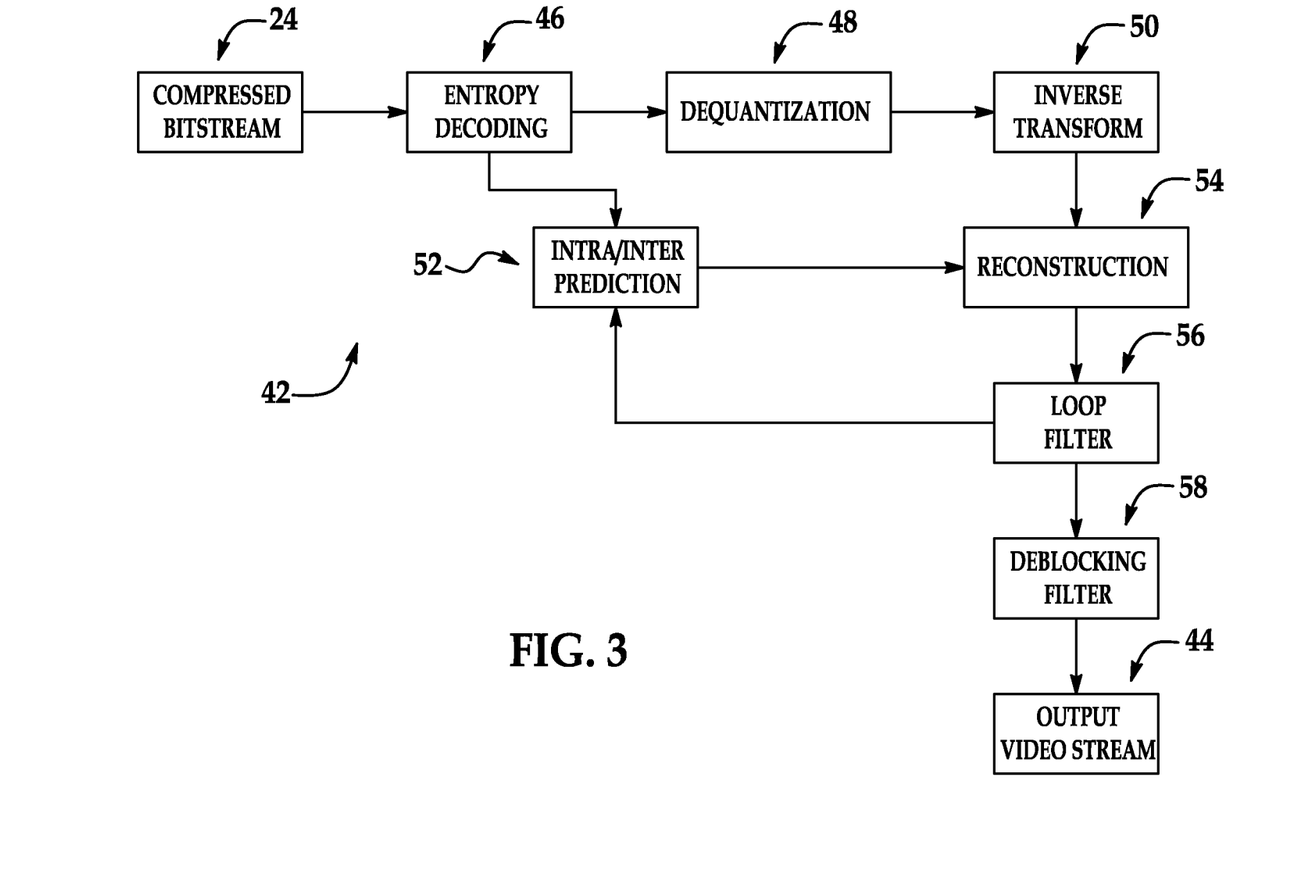
FIG. 3 is a block diagram of a video decompression system in accordance with another embodiment.

FIG. 3 is a block diagram of a video decompression system or decoder 42 to decode compressed bitstream 24. Decoder 42 similar to the reconstruction path of the encoder 20 discussed previously, preferably includes the following stages to perform various functions to produce an output video stream 44 from compressed bitstream 24: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements within compressed bitstream 24 can be entropy decoded by entropy decoding stage 46 (using, for example, Context Adaptive Binary Arithmetic Decoding) to produce a set of quantized transform coefficients. Dequantization stage 48 dequantizes the transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At reconstruction stage 54, the prediction macroblock can be added to the derivative residual to create a reconstructed macroblock. Loop filter 56 can be applied to the reconstructed macroblock to further reduce blocking artifacts. Deblocking filter 58 can be applied to the reconstructed macroblock to reduce blocking distortion, and the result is output as output video stream 44.

Other structural variations of decoder 42 can be used to decode compressed bitstream 24. For example, a decoder may produce output video stream 44 without deblocking filtering stage 58.

Figure 4:
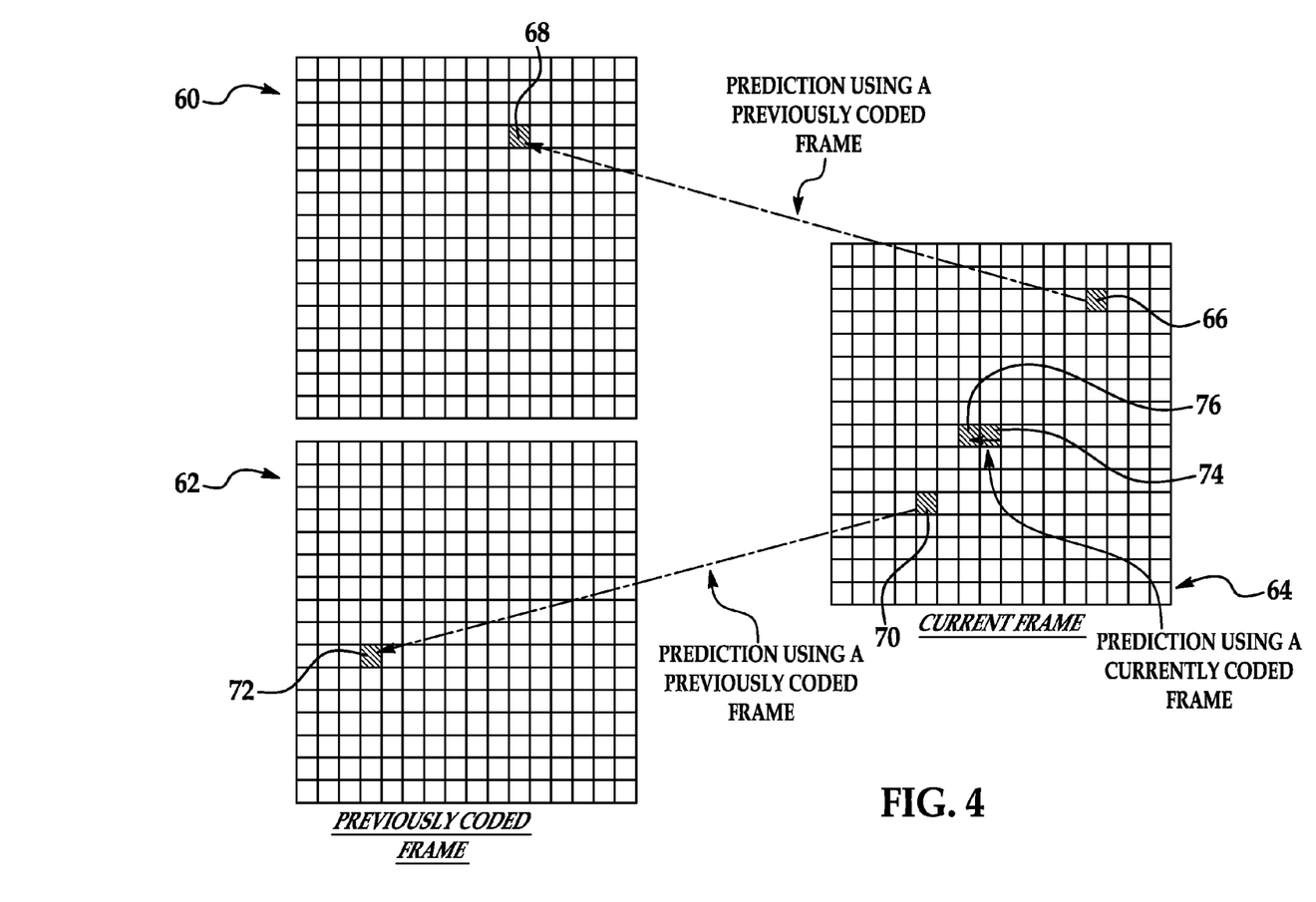
FIG. 4 is a schematic diagram of intra-prediction and inter-prediction modes used in the video compression and decompression systems of FIGS. 2 and 3.

FIG. 4 is a schematic diagram of intra prediction and inter prediction. As illustrated, FIG. 4 shows reference frames 60, 62 and a current frame 64 that is currently being encoded or decoded. As discussed previously, each frame can be processed in units of macroblocks at intra/inter prediction stage 26 or intra/inter prediction stage 52 and each macroblock can be coded using either intra prediction, inter prediction or some combination of inter prediction and intra prediction. For example, a current macroblock 66 is shown being encoded or decoded using inter prediction from a macroblock 68 from previously coded reference frame 60. Similarly, a current macroblock 70 is shown being encoded or decoded using inter prediction from a macroblock 72 from previously encoded reference frame 62. Also, for example, a current macroblock 74 is shown being encoded or decoded using intra prediction from a macroblock 76 within current frame 64.

Hereafter, the embodiments will be described using the term "blocks" which includes macroblocks as described previously. Blocks, like macroblocks, can be of any suitable size.

Inter prediction can utilize block-based motion estimation to compensate for movement of blocks each having, for example, M×N samples (e.g. 16×16) in the current frame. To predict the position of a current block (e.g. current block 70) in a current frame (e.g., frame 64), an area can be searched in a reference frame (e.g., previously coded frame 62) to find a best-matching block. The searched area or search window can be a region in the reference frame that is centered about the same coordinates as the current block in the current frame that is extended by a maximum displacement R. As such, the search window can have an area of (2R+M)×(2R+N). Block-based motion estimation is the process of using a search scheme to find the best-matching block in the search window on the basis of a matching criterion. In some instances, the matching criterion is a measure of error between a block in the search window and the current block, and the best matching block is a block in the search window that has the lowest measure of error. For example, the measure of error can be the mean squared error, mean absolute difference or, normalized cross-correlation function between the current block and the search window block. Other matching criteria are also possible.

The displacement between the current block and the best-matching block is saved as a motion vector for the current block. Subsequently, the best-matching block (i.e. the predictor) is subtracted from the current block to form the residual block. As discussed previously, both the residual block and the motion vector can be further processed and compressed (e.g., through transformation, quantization, and entropy encoding).

Figure 5:
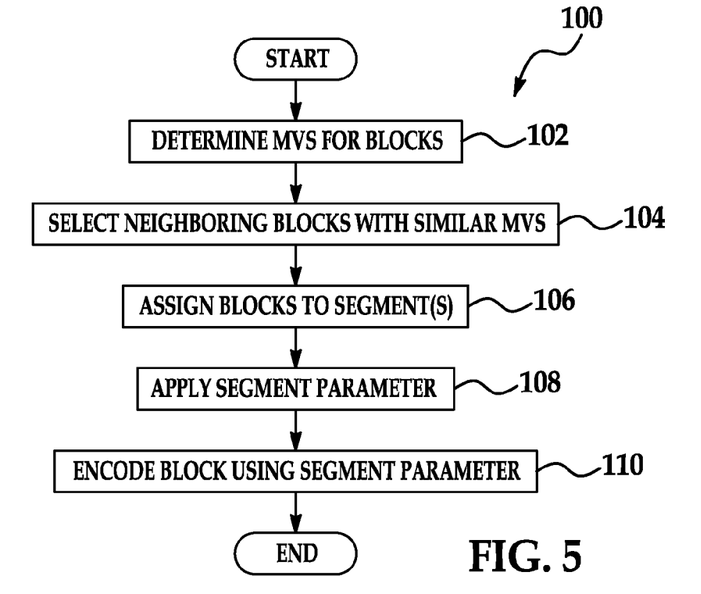
FIG. 5 is an exemplary process of motion estimation for use by the video compression system of FIG. 2.

FIG. 5 is an exemplary process 100 of creating segments in motion vector segmentation for use by, for example, encoder 20. Motion vectors can be determined for each block in a frame (102). Details of one exemplary technique of determining motion vectors have been described previously.

In another embodiment, some or all of the motion vectors can be determined for each block in a frame by receiving this information from an external source. The external source can be, for example, a specialized hardware device (e.g. video encoding chip) that can perform motion estimation. The external source can also be a generic hardware device such a graphics card that can perform motion estimation. Motion estimation information can also be generated during software preprocessing in a software system external to encoder 20. The motion estimation information can also be obtained from another stage of video processing. For example, motion estimation can be produced during video segmentation or content analysis. Motion estimation information can also be obtained during another decoding process. For example, if an encoded video stream is decoded in one format (e.g. MPEG-4), and it is desirable to re-encode the video stream into another format (e.g. VP8), the motion estimation information can be obtained during the MPEG-4 decoding process. Other external sources capable of providing motion estimation information are also available.

Once the motion information has been determined, neighboring blocks having similar motion vectors are identified (104). Similar motion vectors also include motion vectors that are the same. In one implementation, the motion vectors for two neighboring blocks are considered to be similar when the distance between the motion vectors is less than some threshold distance. Other similarity measures are also possible. Neighboring blocks can include adjacent blocks and/or non-adjacent blocks. For example, a neighboring block can be a block located within a predetermined number of blocks from a current block. The predetermined number of blocks can be any suitable number, such as within three blocks from another block.

After neighboring blocks with similar motion vectors have been identified, the blocks are assigned to one or more segments (106). Through this process, all neighboring blocks having similar motion vectors are assigned to the same segment. Similarly, blocks having unique motion vectors are not assigned to any segment. It should be noted, however, that in some embodiments blocks having unique motion vectors are assigned to their own individual segments. In other embodiments, blocks are assigned to a segment only when more than a predetermined number of blocks share a similar motion vector. For example, blocks can be assigned to a segment only if more than 5 blocks share the similar motion vectors. Other segmenting techniques are also possible.

Figure 6A:
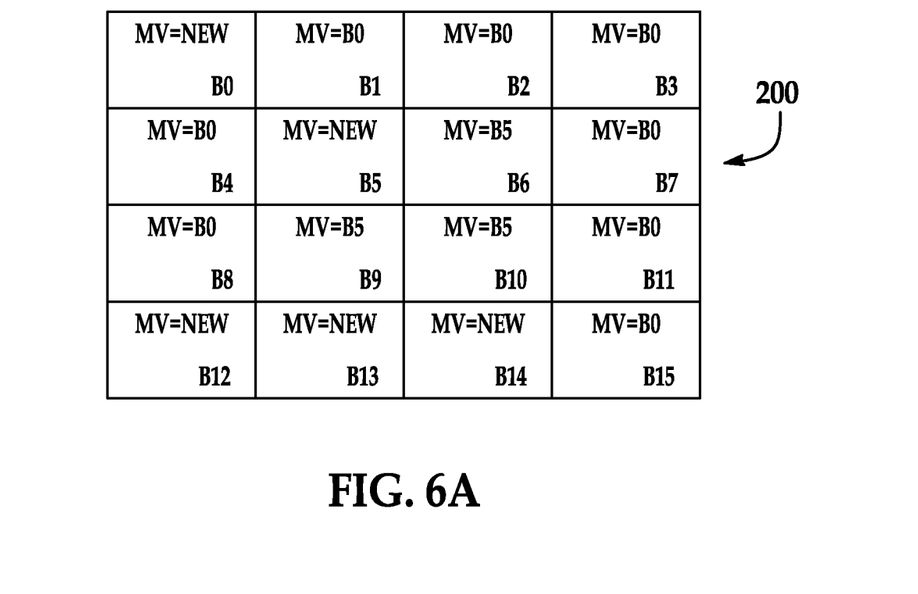
FIG. 6A is an exemplary schematic diagram of motion vector designations for blocks in a frame for processing by the motion estimation process of FIG. 5.

FIG. 6A is an exemplary schematic diagram showing the assignment of motion vectors for blocks B0-B15 in a frame 200. To ease the reader's understanding, frame 200 has been simplified to include only 16 blocks, though any number of blocks can be included. As illustrated, block B0 contains a new motion vector (MV). Blocks B1-B3, B4, B7, B8, B11 and B15 all have motion vectors that are the same or similar to the motion vector of block B0, and are therefore assigned the motion vector from block B0. Thus, the coding mode for B0 can be a new motion vector and the coding mode for the blocks re-using the motion vector from block B0 can be, for example, nearest or near. Similarly, block B5 contains a new motion vector, and blocks B6, B9 and B10 have motion vectors that are the same or similar to the motion vector of block B0, and are therefore assigned the motion vector from block B5. Each of blocks B12, B13 and B14 all have new motion vectors that are not used by any other blocks.

Figure 6B:
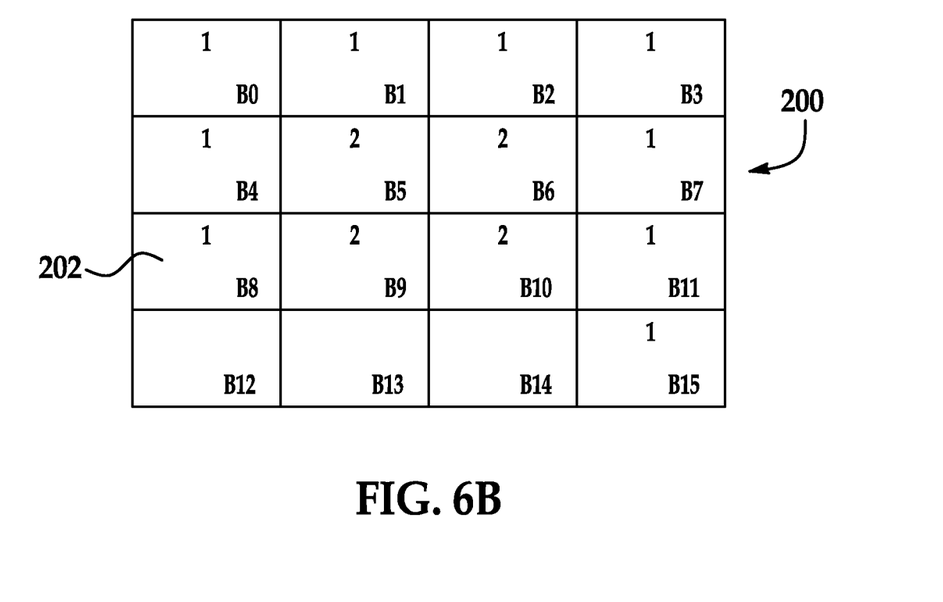
FIG. 6B is an exemplary schematic diagram of the blocks of FIG. 6 assigned to groups.

FIG. 6B is an exemplary schematic diagram showing the assignment of blocks B0-B15 of FIG. 6A to segments in a segmentation map 202 in frame 200. As illustrated, frame 200 includes 2 distinct segments. Blocks B0-B3, B4, B7, B8, B11 and B15, which share the motion vector for block B0, are assigned to segment 1. Blocks B5, B6, B9 and B10, which share the motion vector for block B5, are assigned to segment 2. Blocks B12, block B13 and block B14 are not assigned to any segment because each of these blocks has a unique motion vector that is not shared by any other blocks in frame 200.

Once some or all of the blocks have been assigned to segments, a segment parameter can be applied to each of the segments (108). A more detailed discussion of the application of a segment parameter will be discussed with reference to FIG. 7. The segment parameter can be a quantization level, a loop filter type, a loop filter strength value and/or a motion vector. Other segment parameters are also possible. Each segment parameter can have a value. For example, if the segment parameter is quantization level, it may be assigned a value of 5 for that specific segment.

Figure 7:
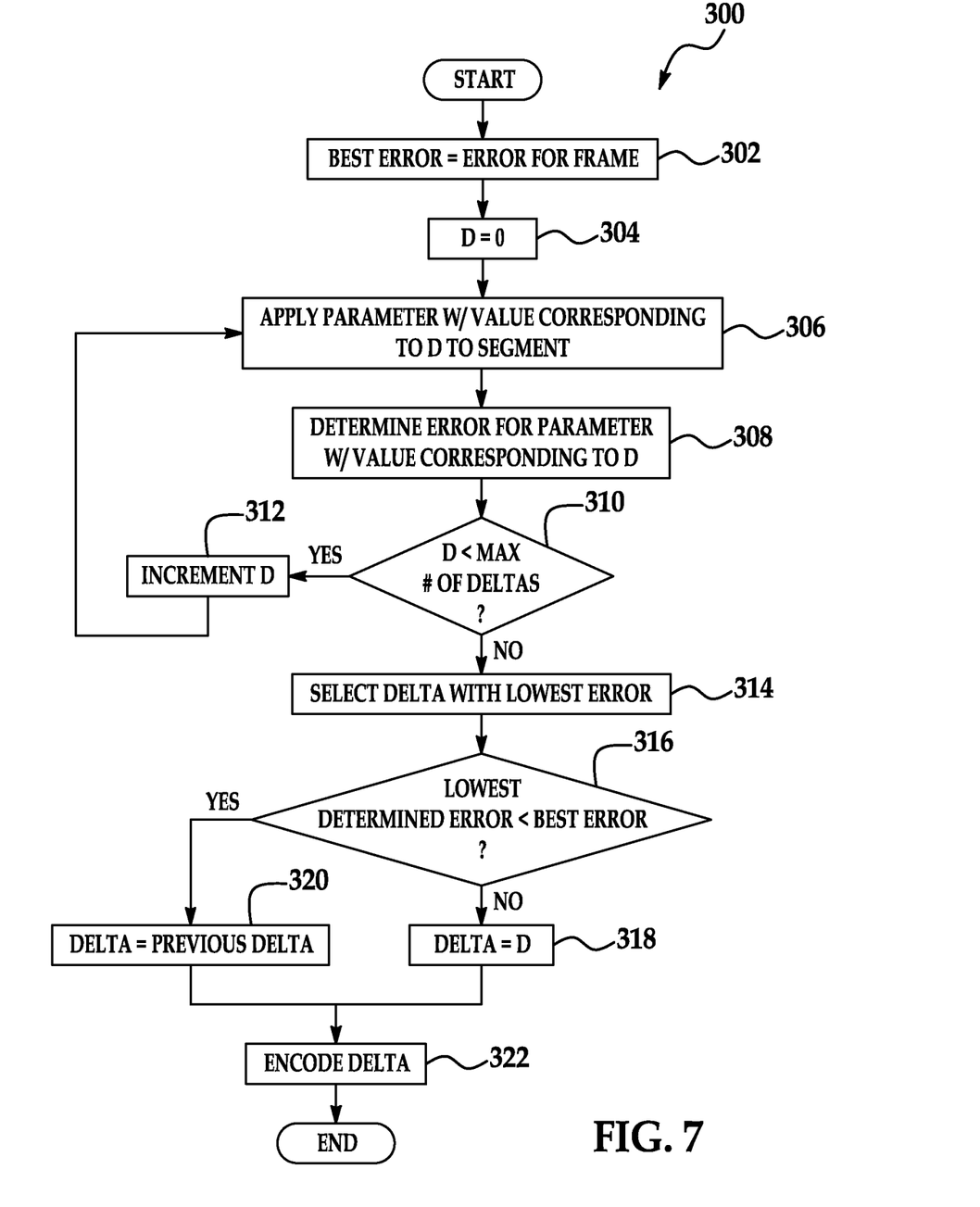
FIG. 7 is an exemplary process of applying a segment parameter in motion vector segmentation for use by the video compression system of FIG. 2.

FIG. 7 is an exemplary process 300 of applying a segment parameter in motion vector segmentation. Beginning at step 302, the variable "Best Error" can be initialized to the error for the previous frame. Then, a variable D can be initialized to 0. Variable D can represent an index value corresponding to a value of the segment parameter. For example, if the segment parameter is quantization level, there can be two values of D (i.e. 0 and 1). The first value of D can represent a quantization level of 5 whereas the second value of D can represent a quantization level of 10, although any values of D are possible.

Then, the value of the segment parameter corresponding to the current index of D is applied to the blocks in the segment (306). The error corresponding to the value of D is determined (308). In one embodiment, the error is the amount of loss of video quality (i.e. reconstruction error). The reconstruction error can be measured by, for example, the Sum of Absolute Errors (SAE), although other suitable measurement techniques are available. In other embodiments, the error is rate or any other suitable measure of error. Other error metrics are also possible.

If D is less than the maximum number of deltas (310), D is incremented (312) and the next D is applied (306). Otherwise, the maximum number of deltas has been reached, and the delta corresponding to the value of D having the lowest error is selected (314). If the lowest determined error is less than the Best Error (316), the current D is selected (318) is set equal to the delta for the segment (318). Otherwise, the delta from the previous frame is selected and remains the delta for the frame (320). The delta selected, (whether current D or the previous delta) is then encoded (322).

Figure 8:
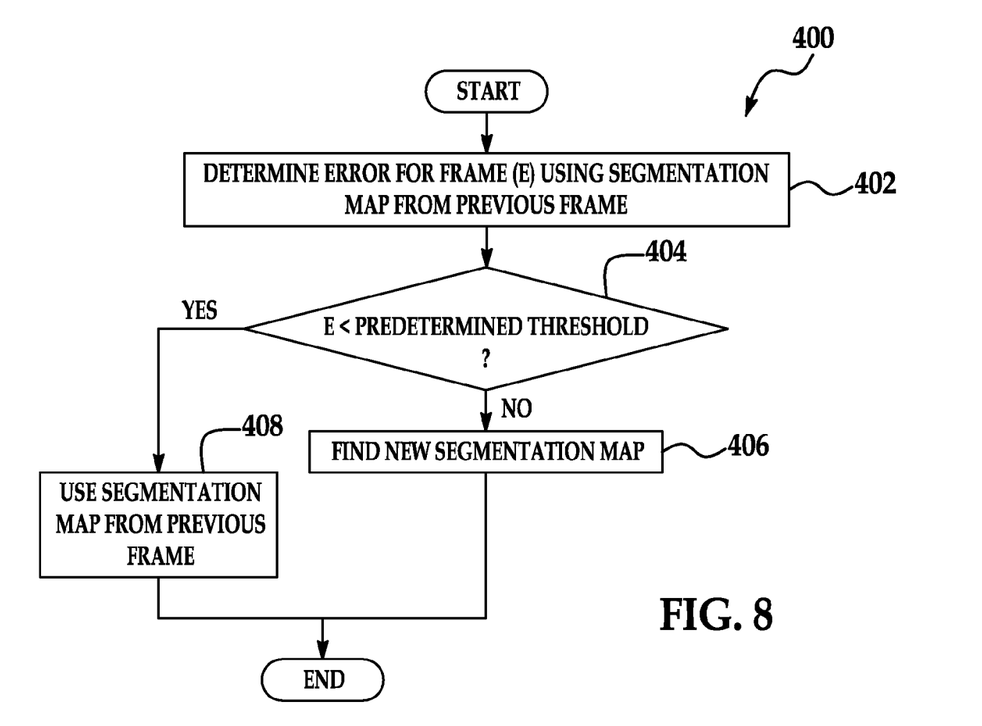
FIG. 8 is an exemplary process of forming a new segmentation map to replace a segmentation map from a previous frame for use by the video compression system of FIG. 2.

FIG. 8 is an exemplary process 400 of forming a new segmentation map to replace a segmentation map from a previous frame (e.g. segmentation map 202) for a new subsequent frame. Encoder 20 can determine to replace the segmentation map on a frame-by-frame basis, although the segmentation map may be replaced based on other techniques (e.g. periodically). Initially, the error "E" for the subsequent frame is determined using the segmentation map from the previous frame (402). If the error "E" exceeds a predetermined threshold value (404), encoder 20 can find a new segmentation map (408). The new segmentation map can be found using the techniques described previously with reference to FIGS. 5, 6A and 6B. The new segmentation map may be encoded and transmitted to decoder 42. Alternatively, in other embodiments, only the differences between the new segmentation map and the segmentation map may be transmitted to decoder 42. Once the new segmentation map has been created, a new value for the segment parameter (or a different segment parameter) can be selected as described with reference to FIG. 7.

Otherwise, if the error does not exceed the predetermined threshold value, encoder 20 can use the current segmentation map from the previous frame. The same value for the segment parameter may also be used, or alternatively, in other embodiments encoder 20 can find a new value for the segment parameter.

Further, if encoder 20 determines that a new segmentation map should be created, a motion search to determine motion vectors can be performed that is biased towards the motion vector of the segment in the segmentation map of the previous frame.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, reference to the term "processor" encompasses both a single processor and multiple processors. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

For example, encoder 20 can be implemented using a general purpose processor with a computer program that, when executed, carries out any of the respective methods, algorithms and/or instructions described herein. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having at least one frame with a plurality of blocks having pixels, comprising:
   determining motion vectors for a first block in the at least one frame and at least some of the blocks that are neighbors to the first block;
   identifying neighboring blocks having motion vectors that are similar to the motion vector of the first block;
   assigning the first block and the identified neighboring blocks to a segment using a processor;
   applying a segment parameter to at least one block in the segment;
   encoding the at least one block using the segment parameter; and
   subsequent to encoding the at least one block using the segment parameter:
      determining a segmentation error associated with applying the segment parameter to a plurality of subsequent frame blocks in a subsequent frame located at corresponding positions as the at least one block in the segment,
      if the determined segmentation error exceeds a predetermined threshold, determining a new segment for the subsequent frame, and
      if the determined segmentation error does not exceed the predetermined threshold, applying the segment parameter to at least one of the plurality of subsequent frame blocks in the subsequent frame.

2. The method of claim 1, wherein the segment parameter is at least one of a quantization level, a loop filter type, a loop filter strength value or a motion vector.

3. The method of claim 1, comprising:
   determining an error associated with applying a first value of the segment parameter to a plurality blocks in the segment;
   determining an error associated with applying a second value of the segment parameter to the plurality of blocks in the segment;
   selecting the first value if the first value's determined error is less than the second value's determined error; and
   selecting the second value if the second value's determined error is less than the first value's determined error.

4. The method of claim 1, further comprising:
   encoding the segment parameter.

5. The method of claim 1, wherein applying the segment parameter comprises:
   applying the segment parameter to all blocks in the segment.

6. The method of claim 1, wherein blocks that are neighbors to the first block include non-adjacent blocks located within a predetermined number of blocks from the first block.

7. The method of claim 1, wherein determining the new segment comprises:
   determining motion vectors for a first block in the subsequent frame and at least some of the blocks that are neighbors to the first block in the subsequent frame;
   identifying neighboring blocks having motion vectors that are similar to the motion vector of the first block in the subsequent frame; and
   assigning the first block and the identified neighboring blocks to the new segment.

8. The method of claim 1, wherein determining the motion vectors comprises:
   receiving the motion vectors from an external source.

9. A method for encoding a video signal having at least one frame with a plurality of blocks having pixels, comprising:
   determining motion vectors for a first block in the at least one frame and at least some of the blocks that are neighbors to the first block;
   identifying neighboring blocks having motion vectors that are similar to the motion vector of the first block;
   assigning the first block and the identified neighboring blocks to a segment using a processor;
   determining a segment parameter value for a segment parameter for the segment, wherein the segment parameter is a non-motion vector parameter; and
   applying the segment parameter value for the segment parameter to at least one block in the segment.

10. The method of claim 9, wherein the segment parameter is at least one of a quantization level, a loop filter type, or a loop filter strength value.

11. The method of claim 9, comprising:
    determining an error associated with applying a first value of the segment parameter to a plurality blocks in the segment;
    determining an error associated with applying a second value of the segment parameter to the plurality of blocks in the segment;
    selecting the first value if the first value's determined error is less than the second value's determined error; and
    selecting the second value if the second value's determined error is less than the first value's determined error.

12. The method of claim 9, further comprising:
    encoding the at least one block in the segment using the segment parameter.

13. The method of claim 9, wherein applying the segment parameter comprises:
    applying the segment parameter to all blocks in the segment.

14. The method of claim 9, wherein blocks that are neighbors to the first block include non-adjacent blocks located within a predetermined number of blocks from the first block.

15. An apparatus for encoding a video signal having at least one frame with a plurality of blocks having pixels, comprising:
    a memory; and
    a processor configured to execute instructions stored in the memory to:
       determine motion vectors for a first block in the at least one frame and at least some of the blocks that are neighbors to the first block;
       identify neighboring blocks having motion vectors that are similar to the motion vector of the first block;
       assign the first block and the identified neighboring blocks to a segment;
       apply a segment parameter to at least one block in the segment;
       encode the at least one block using the segment parameter; and
       subsequent to encoding the at least one block using the segment parameter;
          determine a segmentation error associated with applying the segment parameter to a plurality of subsequent frame blocks in a subsequent frame located at corresponding positions as the at least one block in the segment,
          if the determined segmentation error exceeds a predetermined threshold, determine a new segment for the subsequent frame, and
          if the determined segmentation error does not exceed the predetermined threshold, apply the segment parameter to at least one of the plurality of subsequent frame blocks in the subsequent frame.

16. The apparatus of claim 15, wherein the segment parameter is at least one of a quantization level, a loop filter type, a loop filter strength value or a motion vector.

17. The apparatus of claim 15, wherein the processor is further configured to:
  determine an error associated with applying a first value of the segment parameter to a plurality blocks in the segment;
  determine an error associated with applying a second value of the segment parameter to the plurality of blocks in the segment; and
  select the first value if the first value's determined error is less than the second value's determined error.

18. The apparatus of claim 17, wherein the processor is further configured to:
  select the second value if the second value's determined error is less than the first value's determined error.

* * * * *